United States Patent
Chang et al.

(10) Patent No.: US 10,410,362 B2
(45) Date of Patent: Sep. 10, 2019

(54) METHOD, DEVICE, AND NON-TRANSITORY COMPUTER READABLE STORAGE MEDIUM FOR IMAGE PROCESSING

(71) Applicant: HTC Corporation, Taoyuan (TW)

(72) Inventors: Che-Han Chang, Taoyuan (TW);
Chun-Nan Chou, Taoyuan (TW);
Edward Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 164 days.

(21) Appl. No.: 15/721,967

(22) Filed: Oct. 2, 2017

(65) Prior Publication Data
US 2018/0137633 A1 May 17, 2018

Related U.S. Application Data

(60) Provisional application No. 62/421,387, filed on Nov. 14, 2016.

(51) Int. Cl.
| | | |
|---|---|---|
| G06K 9/00 | (2006.01) | |
| G06T 7/32 | (2017.01) | |
| G06N 3/04 | (2006.01) | |
| G06T 7/37 | (2017.01) | |
| G06K 9/46 | (2006.01) | |
| G06K 9/68 | (2006.01) | |
| G06T 7/33 | (2017.01) | |
| G06T 7/246 | (2017.01) | |
| G06N 3/08 | (2006.01) | |

(Continued)

(52) U.S. Cl.
CPC .............. *G06T 7/32* (2017.01); *G06K 9/4628* (2013.01); *G06K 9/6857* (2013.01); *G06N 3/0454* (2013.01); *G06N 3/084* (2013.01);
*G06T 7/248* (2017.01); *G06T 7/33* (2017.01);
*G06T 7/37* (2017.01); *G06F 17/16* (2013.01);
*G06K 2009/3291* (2013.01); *G06K 2009/6864* (2013.01); *G06T 2200/32* (2013.01); *G06T 2207/20084* (2013.01)

(58) Field of Classification Search
CPC .. G06T 7/32; G06T 7/248; G06T 7/33; G06T 7/37; G06T 2207/20084; G06T 2200/32; G06N 3/084; G06N 3/0454; G06K 9/6857; G06K 9/4628; G06K 2009/6864; G06K 2009/3291; G06F 17/16
USPC ........................................................ 382/293
See application file for complete search history.

(56) References Cited

U.S. PATENT DOCUMENTS

| | | | | |
|---|---|---|---|---|
| 2007/0130095 A1* | 6/2007 | Peot | ...................... | G06T 3/4053 706/20 |
| 2010/0165123 A1* | 7/2010 | Wei | .......................... | G06T 7/20 348/208.4 |

(Continued)

*Primary Examiner* — Van D Huynh
(74) *Attorney, Agent, or Firm* — CKC & Partners Co., LLC

(57) ABSTRACT

An image processing method includes generating, by a processing component, a first input feature map based on an input image using a first convolutional neural network; generating, by the processing component, a first template feature map based on a template image using the first convolutional neural network; generating, by the processing component, a first estimated motion parameter based on an initial motion parameter, the first input feature map and the first template feature map using an iterative Lucas-Kanade network; and performing, by the processing component, image alignment between the input image and the template image based on the first estimated motion parameter.

20 Claims, 7 Drawing Sheets

(51) Int. Cl.
*G06F 17/16* (2006.01)
*G06K 9/32* (2006.01)

(56) References Cited

U.S. PATENT DOCUMENTS

| | | | |
|---|---|---|---|
| 2015/0138322 A1* | 5/2015 | Kawamura | G06T 7/73 348/46 |
| 2015/0229840 A1* | 8/2015 | Sawai | G06T 3/4038 348/36 |
| 2015/0254872 A1* | 9/2015 | de Almeida Barreto | G06T 11/001 382/103 |
| 2017/0280055 A1* | 9/2017 | Kaida | H04N 5/23251 |

* cited by examiner

METHOD, DEVICE, AND NON-TRANSITORY COMPUTER READABLE STORAGE MEDIUM FOR IMAGE PROCESSING

RELATED APPLICATIONS

This application claims priority to U.S. Provisional Application Ser. No. 62/421,387 filed Nov. 14, 2016, which is herein incorporated by reference.

BACKGROUND

Technical Field

The present disclosure relates to an image processing device and an image processing method. More particularly, the present disclosure relates to an image processing device and an image processing method for image alignment.

Description of Related Art

Image alignment involves the process of estimating a parametric motion model between two relative images. Recently, image alignment is widely used in tasks like Panoramic Image Stitching, Optical Flow, Simultaneous Localization and Mapping (SLAM), Visual Odometry (VO), and many other applications.

SUMMARY

One aspect of the present disclosure is related to an image processing method. In accordance with one embodiment of the present disclosure, the image processing method includes generating, by a processing component, a first input feature map based on an input image using a first convolutional neural network; generating, by the processing component, a first template feature map based on a template image using the first convolutional neural network; generating, by the processing component, a first estimated motion parameter based on an initial motion parameter, the first input feature map and the first template feature map using an iterative Lucas-Kanade network; and performing, by the processing component, image alignment between the input image and the template image based on the first estimated motion parameter.

Another aspect of the present disclosure is related to an image processing device. In accordance with one embodiment of the present disclosure, the image processing device includes one or more processing components, a memory electrically connected to the one or more processing components, and one or more programs. The one or more programs are stored in the memory and configured to be executed by the one or more processing components. The one or more programs includes instructions for generating a first input feature map based on an input image using a first convolutional neural network; generating a first template feature map based on a template image using the first convolutional neural network; generating a first estimated motion parameter based on an initial motion parameter, the first input feature map and the first template feature map using an iterative Lucas-Kanade network; and performing image alignment between the input image and the template image based on the first estimated motion parameter.

Another aspect of the present disclosure is related to a non-transitory computer readable storage medium. In accordance with one embodiment of the present disclosure, the non-transitory computer readable storage medium stores one or more programs including instructions, which when executed, causes one or more processing components to perform operations including generating a first input feature map based on an input image using a first convolutional neural network; generating a first template feature map based on a template image using the first convolutional neural network; generating a first estimated motion parameter based on an initial motion parameter, the first input feature map and the first template feature map using an iterative Lucas-Kanade network; and performing image alignment between the input image and the template image based on the first estimated motion parameter.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
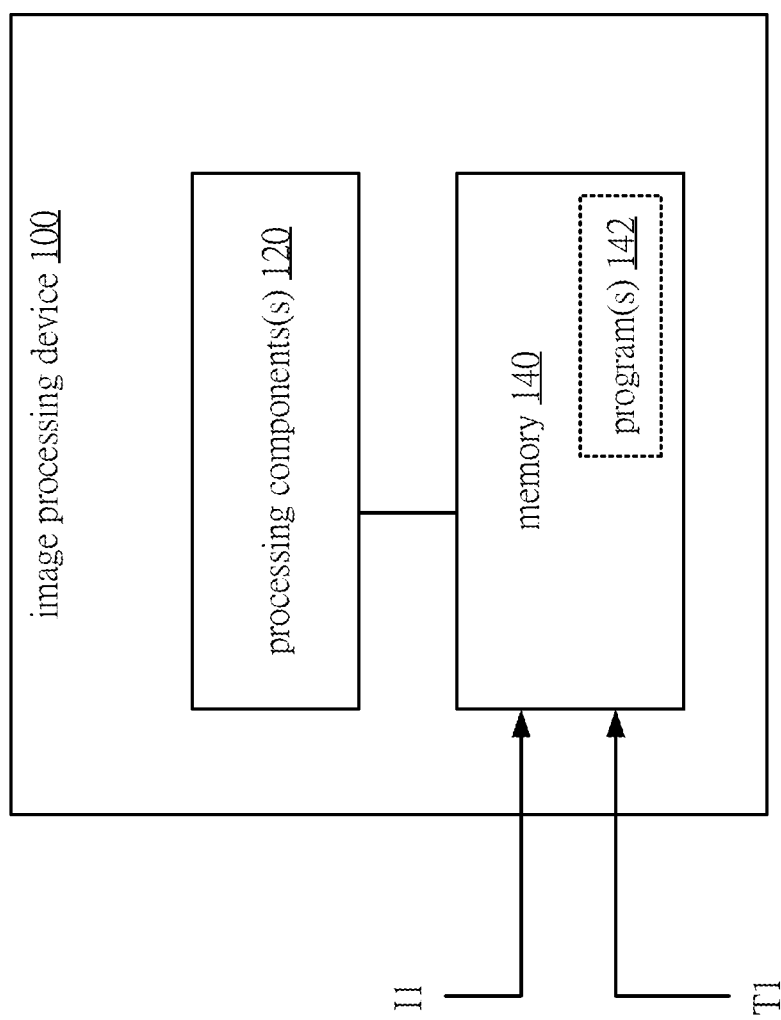
FIG. 1 is a schematic block diagram illustrating an image processing device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a schematic block diagram illustrating an image processing device 100 in accordance with some embodiments of the present disclosure. As shown in FIG. 1, in some embodiments, the image processing device 100 includes one or more processing components 120 and a memory 140. The one or more processing components 120 are electrically connected to the memory 140. In some embodiments, the image processing device 100 may further include signal transceivers (not shown) for transmitting and receiving signals between the image processing device 100 and an external electronic device (not shown) to receive an input image I1 and a template image T1. For example, in some embodiments, the external electronic device may include a camera configured to take pictures in order to provide the input image I1 to the image processing device 100, in which the input image I1 and the template image T1 may be stored in the memory 140.

In some embodiments, the one or more processing components 120 can be realized by, for example, one or more processors, such as central processors and/or microprocessors, but are not limited in this regard. In some embodiments, the memory 140 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In some embodiments, the one or more processing components 120 may run or execute various software programs 142 and/or sets of instructions stored in memory 140 to perform various functions for the image processing device 100 and to process data.

For example, in some embodiments, the one or more processing components 120 may be configured to perform an image processing method for image alignment between the input image I1 and the template image T1, in order to estimate a parametric motion model between the input image I1 and the template image T1. Specifically, image alignment is often required for various application tasks, such as panoramic image stitching, optical flow, simultaneous localization and mapping (SLAM), visual odometry (VO), etc.

Figure 2:
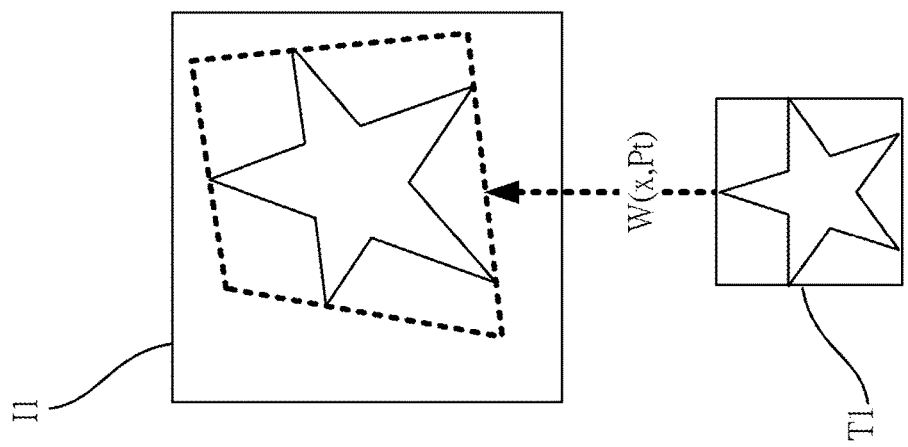
FIG. 2 is a schematic diagram illustrating image alignment between the input image and the template image according to some embodiments of the present disclosure.

Reference is made to FIG. 2. FIG. 2 is a schematic diagram illustrating image alignment between the input image I1 and the template image T1 according to some embodiments of the present disclosure. As shown in FIG. 2, in some embodiments, the template image T1 and the input image I1 may include the same or similar objects with different angles and/or distances. By applying image alignment, the image processing device 100 may determine the coordinates in the input image I1 of which four corners of the template image T1 corresponds to. Accordingly, the image processing device 100 may correspondingly estimate the parametric motion model between the input image I1 and the template image T1.

Specifically, the motion model between the input image I1 and the template image T1 may be represented by a warping function W parameterized by a vector p. The warping function W takes a pixel x in the coordinate of template image and maps the pixel x to a sub-pixel location W(x, p) in the coordinate of the input image I1. Therefore, the image processing device 100 may estimate the parametric motion model and achieve image alignment between the input image I1 and the template image T1 if the image processing device 100 is able to calculate a first estimated motion parameter Pn for the warping function W such that the sum of squared error between the first template feature map FT and the input feature map F1 warped by the warping function W(x,Pn) is minimized.

Figure 3:
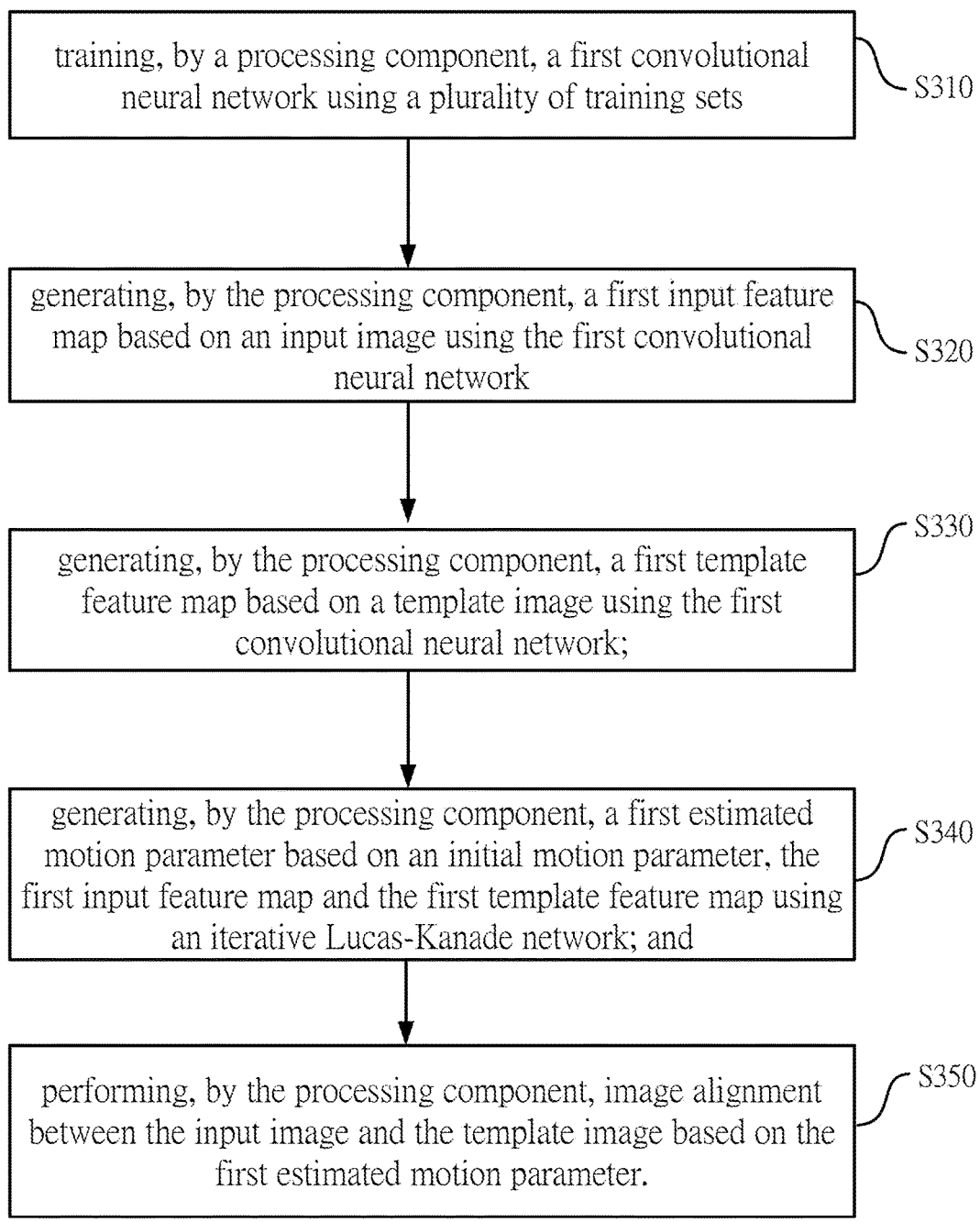
FIG. 3 is a flowchart illustrating an image processing method in accordance with some embodiments of the present disclosure.
Figure 4:
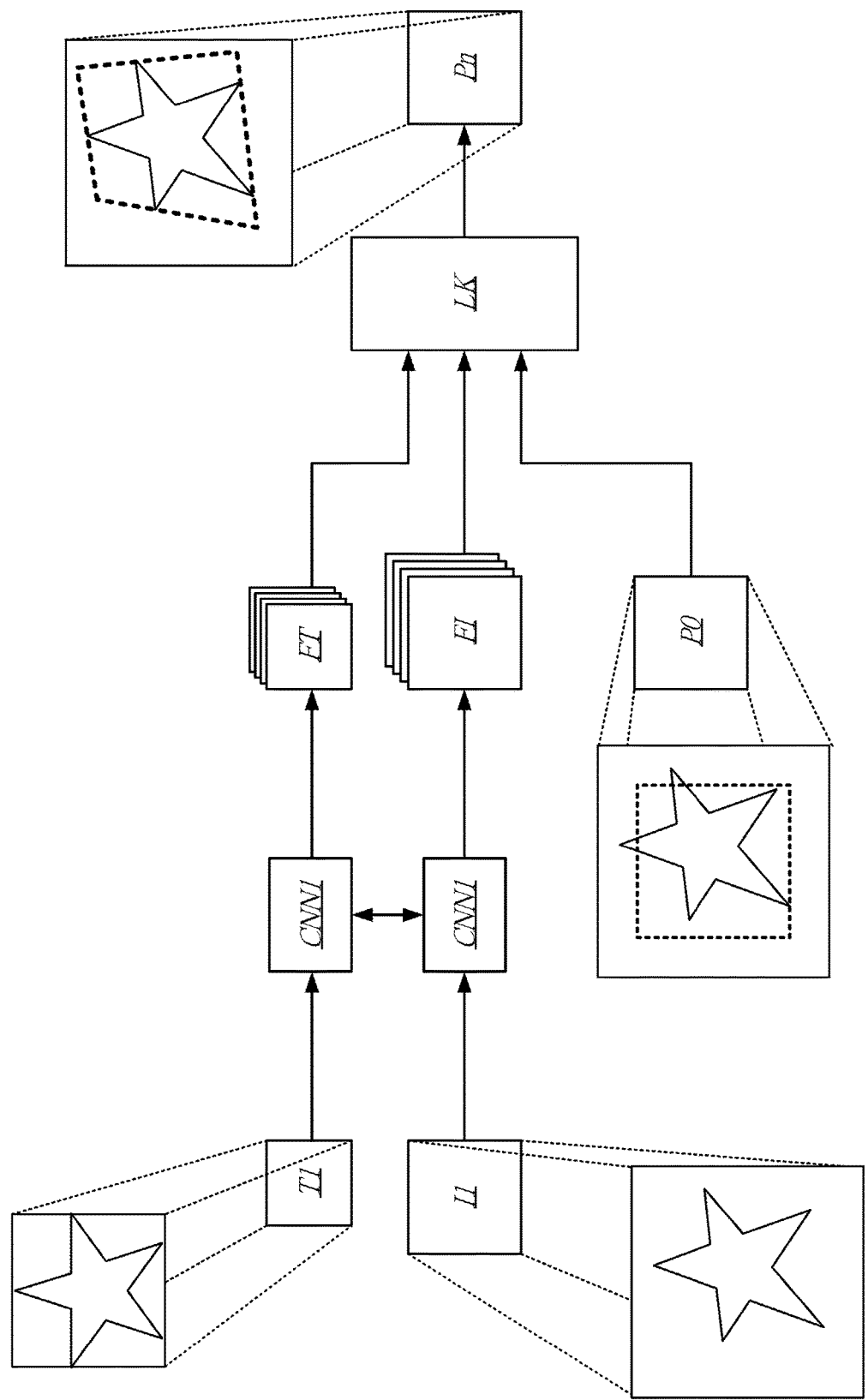
FIG. 4 is a diagram illustrating the operation of the image processing method in accordance with some embodiments of the present disclosure.

For better understanding for the operations to achieve image alignment in the present disclosure, reference is made to FIG. 3 and FIG. 4. FIG. 3 is a flowchart illustrating an image processing method 300 in accordance with some embodiments of the present disclosure. FIG. 4 is a diagram illustrating the operation of the image processing method 300 in accordance with some embodiments of the present disclosure.

It should be noted that the image processing method 300 may be applied to an electric device having a structure that is the same as or similar to the structure of the image processing device 100 shown in FIG. 1. To simplify the description below, the image processing device 100 shown in FIG. 1 will be used as an example to describe the image processing method 300 according to some embodiments of the present disclosure. However, the present disclosure is not limited to application to the embodiment shown in FIG. 1.

As shown in FIG. 3, the image processing method 300 includes operations S310, S320, S330, S340, and S350. The operation S310 is executed during a training phase, and the operations S320, S330, S340, and S350 are executed during an image alignment phase.

First, in the operation S310, the image processing device 100 is configured to train a first convolutional neural network using a plurality of training sets by the one or more processing components 120.

Specifically, each of the training sets includes a training input image, a training template image, an initial motion parameter, and a ground truth motion parameter indicating the image alignment between the training input image and the training template image. In some embodiments, a loss function may be presented as a function of the ground truth motion parameter, the initial motion parameter and the estimated motion parameter. Accordingly, the first convolutional neural network is trained based on minimizing the loss function over the training sets using stochastic gradient descent. In some embodiments, back-propagation may be used to update parameters of the first convolutional neural network, in order to compute the gradients of the network. By executing the stochastic gradient descent algorithm for a number of iterations, parameters of the first convolutional neural network may be trained correspondingly.

After the first convolutional neural network is trained in the training phase, during the image alignment phase, the image processing device 100 may perform estimation of the image alignment using the first convolutional neural network. For better understanding of the operation of image alignment estimation, the operations S320~S350 will be discussed in accompanied with the embodiment illustrated in FIG. 4.

As illustrated in FIG. 4, in the operation S320, the image processing device 100 is configured to generate a first input feature map FI based on the input image I1 using the first convolutional neural network CNN1 by the one or more processing components 120.

Similarly, as illustrated in FIG. 4, in the operation S330, the image processing device 100 is configured to generate a first template feature map FT based on the template image T1 using the first convolutional neural network by the one or more processing components 120.

Alternatively stated, in the operations S320 and S330, the first input feature map FI and the first template feature map FT are multi-channel feature maps extracted by using the convolutional neural networks with shared weights.

As illustrated in FIG. 4, in the operation S340, the image processing device 100 is configured to generate a first estimated motion parameter Pn based on the initial motion parameter P0, the first input feature map FI and the first template feature map FT using an iterative Lucas-Kanade network LK.

Figure 5:
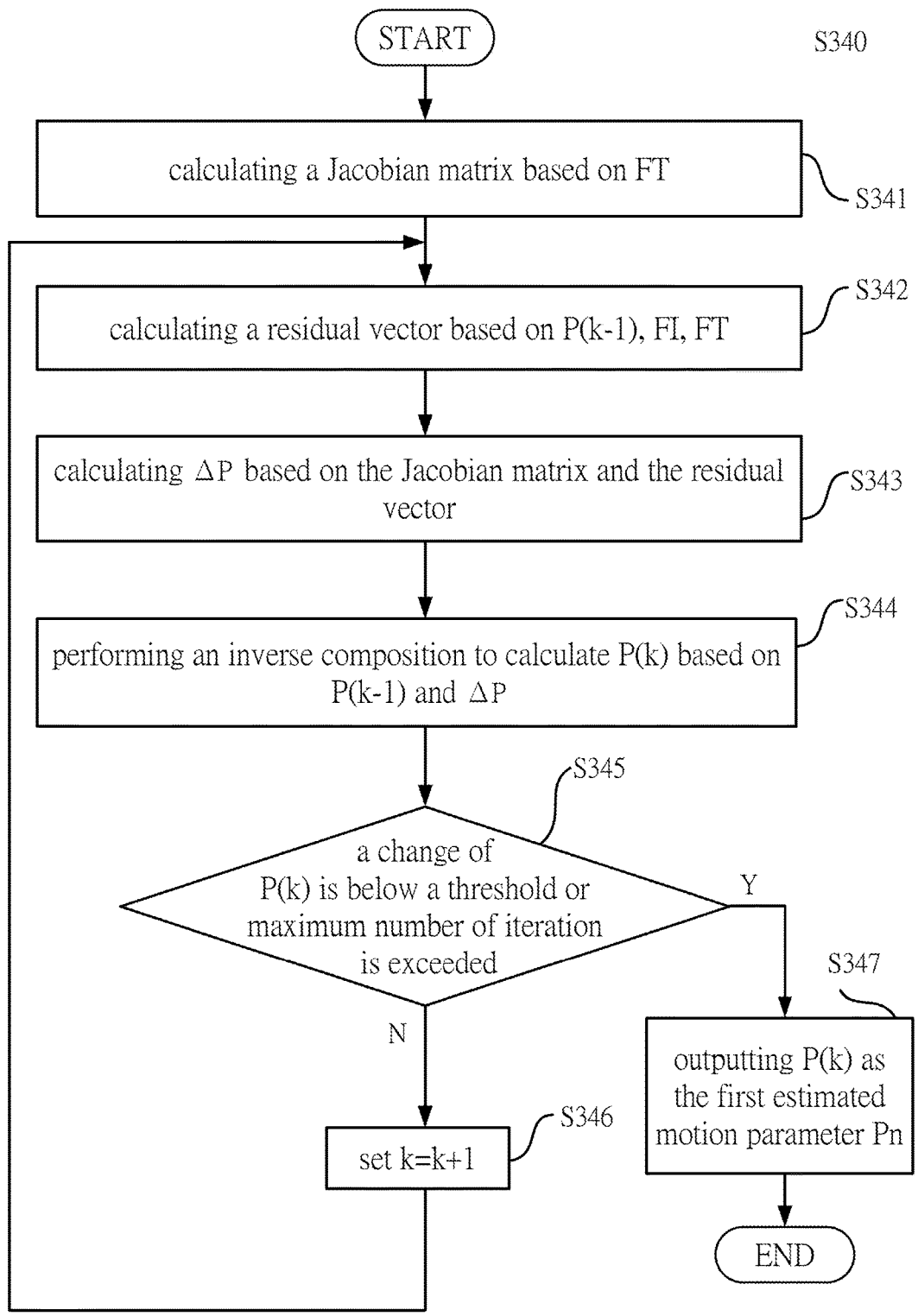
FIG. 5 is a flowchart illustrating the iterative process of the operation of the image processing method in accordance with some embodiments of the present disclosure.

For better understanding for the operations of using the iterative Lucas-Kanade network LK to calculate the first estimated motion parameter Pn based on the initial motion parameter P0, the first input feature map FI and the first template feature map FT, reference is made to FIG. 5. FIG. 5 is a flowchart illustrating the iterative process of the operation S340 of the image processing method 300 in accordance with some embodiments of the present disclosure. To simplify the description below, the embodiment shown in FIG. 5 will be discussed in accompanied with the embodiments shown in FIG. 3 and FIG. 4, but the present disclosure is not limited thereto.

Figure 6:
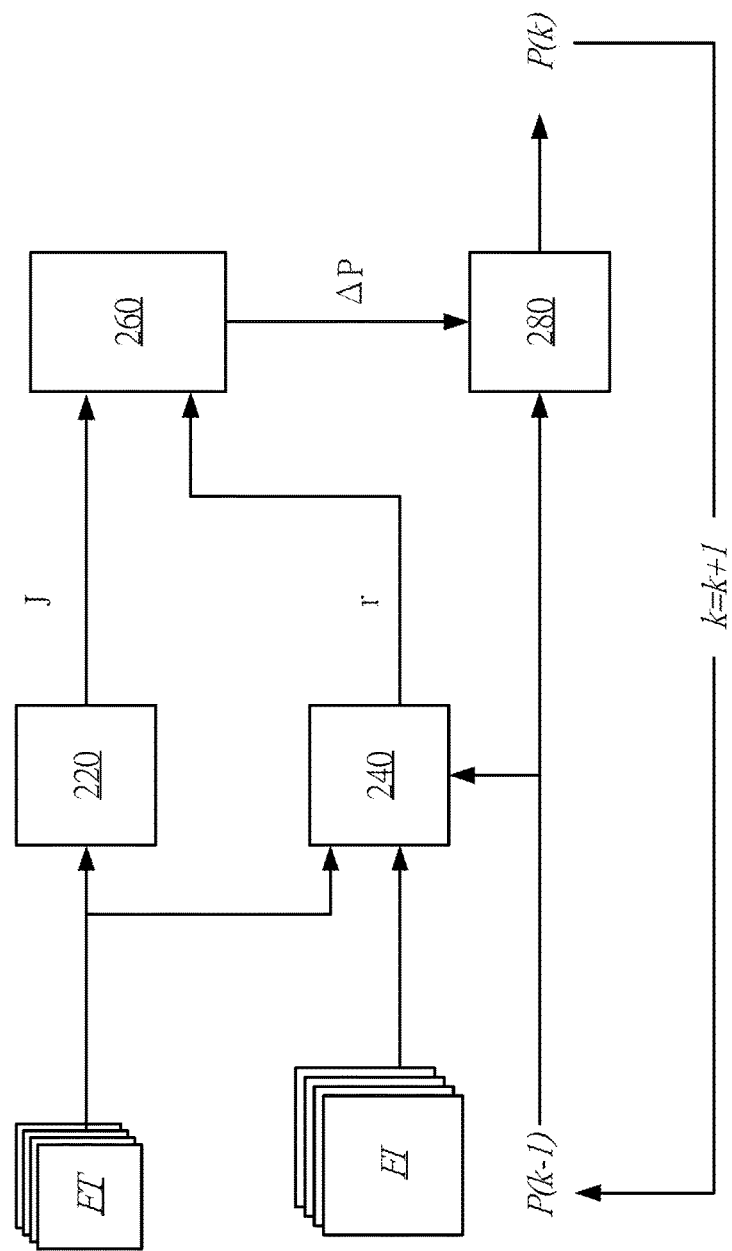
FIG. 6 is a diagram illustrating the operation of the Lucas-Kanade network in accordance with some embodiments of the present disclosure.

As shown in FIG. 5, the operation S340 includes operations S341, S342, S343, S344, S345, S346 and S347. For better understanding, the operations S341~S347 will be discussed in accompanied with the embodiment illustrated in FIG. 6. FIG. 6 is a diagram illustrating the operation of the Lucas-Kanade network LK in accordance with some embodiments of the present disclosure.

In general, the Lucas-Kanade algorithm runs multiple iterations to find the true motion. For the k-th iteration, the Lucas-Kanade network LK is configured to calculate an estimated motion candidate P(k) based on the estimated motion candidate P(k−1) obtained from the previous iteration, the first input feature map FI and the first template feature map FT. For example, in the first iteration, the Lucas-Kanade network LK calculates the estimated motion candidate P(1) based on the initial motion parameter P0, the first input feature map FI and the first template feature map FT.

As illustrated in FIG. 6, in the operation S341, a Jacobian matrix computing unit 220 in the Lucas-Kanade network LK is configured to calculate a Jacobian matrix J based on the first template feature map FT by the one or more processing components 120.

As illustrated in FIG. 6, in the operation S342, a residual vector computing unit 240 in the Lucas-Kanade network LK is configured to calculate a residual vector r based on the first input feature map FI, the first template feature map FT, and the estimated motion candidate P(k−1) obtained from the previous iteration during the k-th iteration by the one or more processing components 120. It is noted that, during the first iteration, the predefined initial motion parameter P0 is applied to calculate the residual vector r.

As illustrated in FIG. 6, in the operation S343, an incremental update value computing unit 260 in the Lucas-Kanade network LK is configured to calculate an incremental update value $\Delta p$ based on the Jacobian matrix J and the residual vector r by the one or more processing components 120.

As illustrated in FIG. 6, in the operation S344, an estimated motion candidate updating unit 280 in the Lucas-Kanade network LK is configured to perform an inverse composition to calculate and update the estimated motion candidate P(k) based on the estimated motion candidate P(k−1) obtained from the previous iteration and the incremental update value $\Delta p$. It is noted that, similarly, during the first iteration, the predefined initial motion parameter P0 is applied to calculate the first estimated motion candidate P1.

In the operation S345, the Lucas-Kanade network LK is configured to determine whether to terminate the iteration process. Specifically, on the condition that a change of the estimated motion candidate P(k) is below a threshold, or a maximum number of iteration is exceeded, operation S347 is executed and the estimated motion candidate P(k) is outputted as the first estimated motion parameter Pn.

On the other hand, if the termination condition is not satisfied, operation S346 is executed and the operations S342~S345 are repeated to perform multiple iterations to update the estimated motion candidate P(k) until the change of the estimated motion candidate P(k) is below the threshold, or on the condition that the maximum number of iteration is exceeded.

As shown in FIG. 5 and FIG. 6, when performing the iterations to update the estimated motion candidate P(k), the residual vector r is updated based on the previous estimated motion candidate P(k−1), the first input feature map FI and the first template feature map FT. Then, the incremental update value $\Delta p$ is updated based on the Jacobian matrix J and the updated residual vector r accordingly. Then, the inverse composition may be performed based on the updated incremental update value $\Delta p$ to update the estimated motion candidate P(k).

Thus, by performing the iterations as stated above, in the operation S340, the Lucas-Kanade network LK may perform the Lucas-Kanade algorithm and output the first estimated motion parameter Pn, in which the first estimated motion parameter Pn indicates the vector parameter p for the warping function W(x,p) to minimize the sum of squared error between the first template feature map FT and the input feature map FI warped by the warping function W(x,p).

Finally, in the operation S350, the image processing device 100 is configured to perform the image alignment between the input image I1 and the template image T1 based on the first estimated motion parameter Pn by the one or more processing components 120. Thus, by applying the image processing method 300, the efficiency and accuracy for performing the image alignment may be improved.

Figure 7:
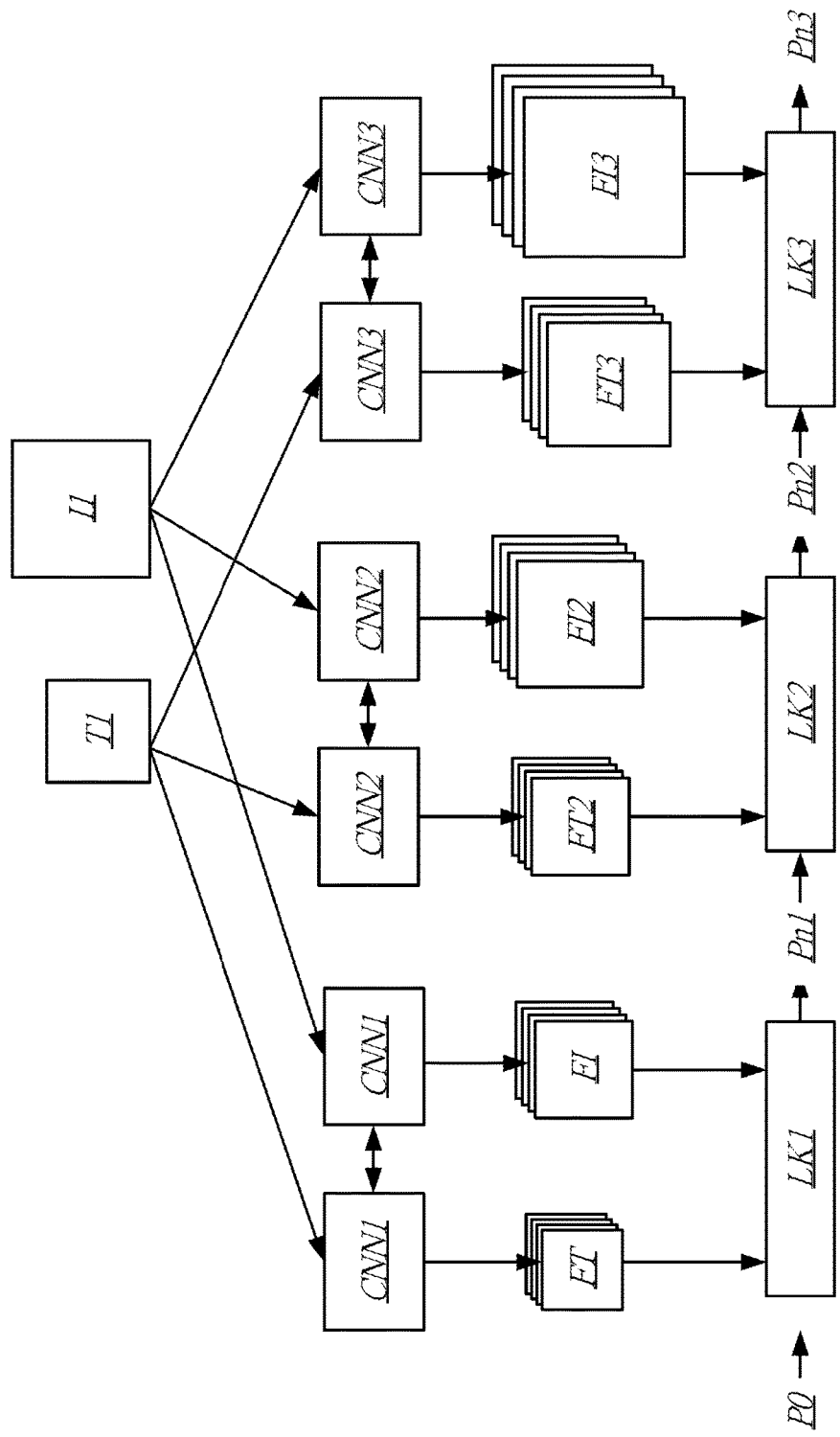
FIG. 7 is a diagram illustrating the operation of the image processing method in accordance with some other embodiments of the present disclosure.

Reference is made to FIG. 7. FIG. 7 is a diagram illustrating the operation of the image processing method 300 in accordance with some other embodiments of the present disclosure.

In some other embodiments, a cascaded Lucas-Kanade network for image alignment may be implemented. As illustrated in FIG. 7, in the operation S320, the image processing device 100 is further configured to generate a second input feature map FI2 based on the input image I1 using a second convolutional neural network CNN2 by the one or more processing components 120, and generate a third input feature map FI3 based on the input image I1 using a third convolutional neural network CNN3 by the one or more processing components 120.

Similarly, as illustrated in FIG. 7, in the operation S330, the image processing device 100 is further configured to generate a second template feature map FT2 based on the template image T1 using the second convolutional neural network CNN2 by the one or more processing components 120, and generate a third template feature map FT3 based on the template image T1 using the third convolutional neural network CNN3 by the one or more processing components 120.

Similarly, the input feature maps FI2, FI3 and the template feature maps FT2, FT3 are also multi-channel feature maps extracted by using the convolutional neural networks CNN2, CNN3 with respectively shared weights.

As illustrated in FIG. 7, in the operation S340, the image processing device 100 is configured to generate the first estimated motion parameter Pn1 based on the initial motion parameter P0, the first input feature map FI and the first template feature map FT using the iterative Lucas-Kanade network LK1, and then generate the second estimated motion parameter Pn2 based on the first estimated motion parameter Pn1, the second input feature map FI2 and the second template feature map FT2 using the iterative Lucas-Kanade network LK2, and then generate the third estimated motion parameter Pn3 based on the second estimated motion parameter Pn2, the third input feature map FI3 and the third template feature map FT3 using the iterative Lucas-Kanade network LK3.

It is also noted that, the convolutional neural networks CNN1, CNN2, and CNN3 may be respectively trained during the training phase. Specifically, in the operation S310, the first convolutional neural network CNN1 is trained using a plurality of first training sets. Each of the first training sets includes a training input image, a training template image, the initial motion parameter, and a ground truth motion parameter indicating the image alignment between the training input image and the training template image. Similarly, the second and the third convolutional neural networks CNN2, CNN3 are respectively trained using a plurality of second training sets and a plurality of third training sets. Each of the second training sets and of the third training sets includes the training input image, the training template image, the initial motion parameter, and the ground truth motion parameter indicating the image alignment between the training input image and the training template image.

In some embodiments, the first convolutional neural network CNN1 is configured to produce the first template feature map FT and the first input feature map FI with a first down-sampling factor. The second convolutional neural network CNN2 is configured to produce the second template feature map FT2 and the second input feature map FI2 with a second down-sampling factor smaller than the first down-sampling factor. Similarly, the third convolutional neural network CNN3 is configured to produce the third template feature map FT3 and the third input feature map FI3 with a third down-sampling factor smaller than the second down-sampling factor.

Accordingly, the size of the first template feature map FT1 is smaller than the size of the second template feature map FT2, and the size of the second template feature map FT2 is smaller than the size of the third template feature map FT2. Thus, a cascaded feature learning method is proposed and the coarse-to-fine strategy is incorporated into the training and the image alignment process. Accordingly, each feature map is obtained from a forward pass of a corresponding convolutional neural network CNN1, CNN2 or CNN3 associated to the level. Then, the Lucas-Kanade algorithm is performed sequentially from coarse levels to fine levels, in order to refine the estimated motion parameter Pn1, Pn2, to Pn3 progressively.

It is noted that, though a 3-level cascaded Lucas-Kanade network is discussed in FIG. 7, the present disclosure is not limited thereto. Alternatively, the image processing method 300 may also implement a 2-level cascaded Lucas-Kanade network, or k-level cascaded Lucas-Kanade, in which k may be any integer larger than 2, and the later level in the cascaded Lucas-Kanade network has a smaller down-sampling factor and larger size of the feature maps than of which in the previous level.

In summary, by adopting the cascaded feature learning method discussed above, a cascaded Lucas-Kanade network may be implemented, and used to perform alignment in a coarse-to-fine manner, and the pyramid representation may improve the convergence range of the Lucas-Kanade network. Overall, by applying the image processing method and the image processing device in various embodiments of the present disclosure, less numbers of iterations are required to converge, and the efficiency and accuracy for performing the image alignment may be improved.

It should be noted that, in some embodiments, the image processing method 300 may also be implemented as a computer program. When the computer program is executed by a computer, an electronic device, or the one or more processing components 120 in FIG. 1, this executing device performs the image processing method 300. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the image processing method 300, no particular sequence is required unless otherwise specified. Moreover, the operations may also be performed simultaneously or the execution times thereof may at least partially overlap.

Furthermore, the operations of the image processing method 300 may be added to, replaced, and/or eliminated as appropriate, in accordance with various embodiments of the present disclosure.

Although the present disclosure has been described in considerable detail with reference to certain embodiments thereof, other embodiments are possible. Therefore, the scope of the appended claims should not be limited to the description of the embodiments contained herein.

What is claimed is:

1. An image processing method comprising:
   generating, by a processing component, a first input feature map based on an input image using a first convolutional neural network;
   generating, by the processing component, a first template feature map based on a template image using the first convolutional neural network;
   generating, by the processing component, a first estimated motion parameter based on an initial motion parameter, the first input feature map and the first template feature map using an iterative Lucas-Kanade network; and
   performing, by the processing component, image alignment between the input image and the template image based on the first estimated motion parameter.

2. The image processing method of claim 1, wherein generating the first estimated motion parameter using the iterative Lucas-Kanade network comprises:
   calculating, by the processing component, a Jacobian matrix based on the first template feature map;
   calculating, by the processing component, a residual vector based on the initial motion parameter, the first input feature map and the first template feature map;
   calculating, by the processing component, an incremental update value based on the Jacobian matrix and the residual vector; and
   performing, by the processing component, an inverse composition to calculate an estimated motion candidate based on the initial motion parameter and the incremental update value.

3. The image processing method of claim 2, wherein generating the first estimated motion parameter using the iterative Lucas-Kanade network further comprises:
   performing a plurality of iterations to update the estimated motion candidate until a change of the estimated motion candidate is below a threshold, or on the condition that a maximum number of iteration is exceeded.

4. The image processing method of claim 3, wherein performing the iterations to update the estimated motion candidate comprises:
   updating, by the processing component, the residual vector based on the estimated motion candidate, the first input feature map and the first template feature map;
   updating, by the processing component, the incremental update value based on the Jacobian matrix and the updated residual vector; and
   performing, by the processing component, the inverse composition to update the estimated motion candidate based on the updated incremental update value.

5. The image processing method of claim 1, further comprising:
   training, by the processing component, the first convolutional neural network using a plurality of training sets, wherein each of the training sets comprises a training input image, a training template image, the initial motion parameter, and a ground truth motion parameter indicating the image alignment between the training input image and the training template image.

6. The image processing method of claim 1, further comprising:
   generating, by the processing component, a second input feature map based on the input image using a second convolutional neural network;
   generating, by the processing component, a second template feature map based on the template image using the second convolutional neural network;
   generating, by the processing component, a second estimated motion parameter based on the first estimated motion parameter, the second input feature map and the second template feature map using the iterative Lucas-Kanade network; and
   performing, by the processing component, image alignment between the input image and the template image based on the second estimated motion parameter.

7. The image processing method of claim 6, further comprising:
   training, by the processing component, the first convolutional neural network using a plurality of first training sets, wherein each of the first training sets comprises a training input image, a training template image, the initial motion parameter, and a ground truth motion parameter indicating the image alignment between the training input image and the training template image; and
   training, by the processing component, the second convolutional neural network using a plurality of second training sets, wherein each of the second training sets comprises the training input image, the training template image, the first estimated motion parameter, and the ground truth motion parameter.

8. The image processing method of claim 6, wherein the first convolutional neural network is configured to produce the first template feature map with a first down-sampling factor, and the second convolutional neural network is configured to produce the second template feature map with a second down-sampling factor smaller than the first down-sampling factor.

9. An image processing device comprising:
   one or more processing components;
   a memory electrically connected to the one or more processing components; and
   one or more programs, wherein the one or more programs are stored in the memory and configured to be executed by the one or more processing components, the one or more programs comprising instructions for:
   generating a first input feature map based on an input image using a first convolutional neural network;
   generating a first template feature map based on a template image using the first convolutional neural network;
   generating a first estimated motion parameter based on an initial motion parameter, the first input feature map and the first template feature map using an iterative Lucas-Kanade network; and
   performing image alignment between the input image and the template image based on the first estimated motion parameter.

10. The image processing device as claimed in claim 9, further comprising instructions for:
    calculating a Jacobian matrix based on the first template feature map;

calculating a residual vector based on the initial motion parameter, the first input feature map and the first template feature map;

calculating an incremental update value based on the Jacobian matrix and the residual vector; and performing an inverse composition to calculate an estimated motion candidate based on the initial motion parameter and the incremental update value.

11. The image processing device as claimed in claim 10, further comprising instructions for:

performing a plurality of iterations to update the estimated motion candidate until a change of the estimated motion candidate is below a threshold, or on the condition that a maximum number of iteration is exceeded.

12. The image processing device as claimed in claim 11, further comprising instructions for:

updating the residual vector based on the estimated motion candidate, the first input feature map and the first template feature map;

updating the incremental update value based on the Jacobian matrix and the updated residual vector; and performing the inverse composition to update the estimated motion candidate based on the updated incremental update value.

13. The image processing device as claimed in claim 9, further comprising instructions for:

training, by the processing component, the first convolutional neural network using a plurality of training sets, wherein each of the training sets comprises a training input image, a training template image, the initial motion parameter, and a ground truth motion parameter indicating the image alignment between the training input image and the training template image.

14. The image processing device as claimed in claim 9, further comprising instructions for:

generating a second input feature map based on the input image using a second convolutional neural network;

generating a second template feature map based on the template image using the second convolutional neural network;

generating a second estimated motion parameter based on the first estimated motion parameter, the second input feature map and the second template feature map using the iterative Lucas-Kanade network; and performing image alignment between the input image and the template image based on the second estimated motion parameter.

15. The image processing device as claimed in claim 14, further comprising instructions for:

training the first convolutional neural network using a plurality of first training sets, wherein each of the first training sets comprises a training input image, a training template image, the initial motion parameter, and a ground truth motion parameter indicating the image alignment between the training input image and the training template image; and training the second convolutional neural network using a plurality of second training sets, wherein each of the second training sets comprises the training input image, the training template image, the first estimated motion parameter, and the ground truth motion parameter.

16. The image processing device as claimed in claim 9, wherein the first convolutional neural network is configured to produce the first template feature map with a first down-sampling factor, and the second convolutional neural network is configured to produce the second template feature map with a second down-sampling factor smaller than the first down-sampling factor.

17. A non-transitory computer readable storage medium storing one or more programs comprising instructions, which when executed, causes one or more processing components to perform operations comprising:

generating a first input feature map based on an input image using a first convolutional neural network;

generating a first template feature map based on a template image using the first convolutional neural network;

generating a first estimated motion parameter based on an initial motion parameter, the first input feature map and the first template feature map using an iterative Lucas-Kanade network; and performing image alignment between the input image and the template image based on the first estimated motion parameter.

18. The non-transitory computer readable storage medium as claimed in claim 17 comprising instructions, which when executed, causes the one or more processing components to further perform operations comprising:

calculating a Jacobian matrix based on the first template feature map;

calculating a residual vector based on the initial motion parameter, the first input feature map and the first template feature map;

calculating an incremental update value based on the Jacobian matrix and the residual vector; and performing an inverse composition to calculate an estimated motion candidate based on the initial motion parameter and the incremental update value.

19. The non-transitory computer readable storage medium as claimed in claim 17 comprising instructions, which when executed, causes the one or more processing components to further perform operations comprising:

training the first convolutional neural network using a plurality of training sets, wherein each of the training sets comprises a training input image, a training template image, the initial motion parameter, and a ground truth motion parameter indicating the image alignment between the training input image and the training template image.

20. The non-transitory computer readable storage medium as claimed in claim 17 comprising instructions, which when executed, causes the one or more processing components to further perform operations comprising:

generating a second input feature map based on the input image using a second convolutional neural network;

generating a second template feature map based on the template image using the second convolutional neural network;

generating a second estimated motion parameter based on the first estimated motion parameter, the second input feature map and the second template feature map using the iterative Lucas-Kanade network; and performing image alignment between the input image and the template image based on the second estimated motion parameter.

* * * * *